(12) United States Patent
Motegi

(10) Patent No.: US 7,088,017 B2
(45) Date of Patent: Aug. 8, 2006

(54) POWER SUPPLY CONTROL DEVICE FOR AN IMAGE FORMING APPARATUS

(75) Inventor: Akihiko Motegi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 549 days.

(21) Appl. No.: 10/259,330

(22) Filed: Sep. 30, 2002

(65) Prior Publication Data

US 2003/0072024 A1    Apr. 17, 2003

(30) Foreign Application Priority Data

Sep. 28, 2001  (JP)  ............................. 2001-300734

(51) Int. Cl.
*H01H 3/02*  (2006.01)
(52) U.S. Cl. .................................. 307/140; 399/37
(58) Field of Classification Search ................ 307/140; 358/1.14; 399/90, 37, 88
See application file for complete search history.

(56) References Cited

U.S. PATENT DOCUMENTS

| | | | |
|---|---|---|---|
| 3,737,734 A * | 6/1973 | Nakamura et al. ........... 361/197 |
| 4,480,195 A | 10/1984 | Sawaki et al. | |
| 5,061,957 A * | 10/1991 | Nishikawa et al. ............ 399/88 |
| 5,194,879 A | 3/1993 | Kotabe et al. | |
| 5,384,491 A * | 1/1995 | Suizu ......................... 307/113 |
| 5,610,724 A | 3/1997 | Kaneko et al. | |
| 5,710,959 A * | 1/1998 | Hirooka et al. ................ 399/88 |
| 6,105,140 A * | 8/2000 | Crisan ......................... 713/310 |
| 6,192,209 B1 * | 2/2001 | Ichikawa et al. ............ 399/105 |
| 6,307,640 B1 | 10/2001 | Motegi | |

FOREIGN PATENT DOCUMENTS

JP        01-057870        3/1989

* cited by examiner

*Primary Examiner*—Brian Sircus
*Assistant Examiner*—Brett Squires
(74) *Attorney, Agent, or Firm*—Oblon, Spivak, McClelland, Maier & Neustadt, P.C.

(57) ABSTRACT

A power supply control device for an image forming apparatus of the present invention includes a shutoff detector for monitoring the state of a power switch. In response to the output signal of the shutoff detector representative of the turn-off of the power switch, a shutoff processing section executes processing for avoiding accidental error detection and protecting a memory before the output voltage of a DC power supply drops to a preselected level.

12 Claims, 6 Drawing Sheets

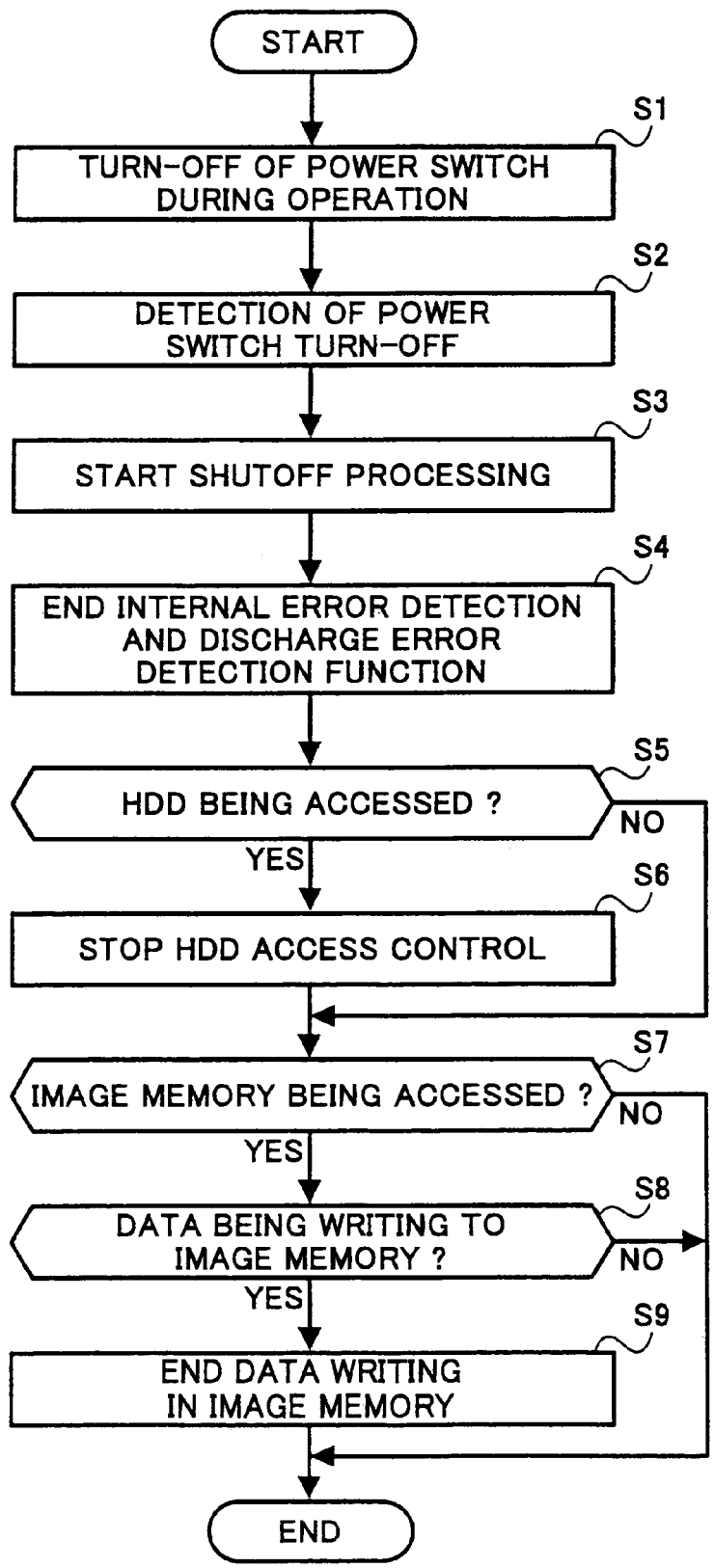

POWER SUPPLY CONTROL DEVICE FOR AN IMAGE FORMING APPARATUS

BACKGROUND OF THE INVENTION

1. Field of the Invention

The present invention relates to a power supply control device for a copier, printer, facsimile apparatus or similar image forming apparatus and more particularly to a power supply control device capable of obviating accidental error detection when the power switch of an image forming apparatus is turned off.

2. Description of the Background Art

Generally, when a power switch provided on an image forming apparatus is turned off, power supply to the entire system of the apparatus including controllers is shut off. Therefore, when the operator of the apparatus inadvertently turns off the power switch, a control unit including a CPU (Central Processing Unit) automatically stops executing control without recognizing the inadvertent turn-off of the power switch. This gives rise to the following problems.

When the power switch is turned off while, e.g., printing is under way, the entire drive system and entire control system of the apparatus stop operating. In this case, if the drive system operates in an unusual manner due to the drop of a power supply voltage before the control system stops operating, the control unit detects the unusual operation and writes it in, e.g., a nonvolatile memory. That is, an error history is written to the memory despite that the apparatus is free from an error. Further, in an advanced image forming apparatus with a server function implemented by a hard disk, when the power switch of the apparatus is turned off during writing of data in the hard disk or during access to the hard disk, it is likely that data stored in the hard disk are destroyed. Moreover, assume that the power switch is turned off while, e.g., a motor is in rotation, causing the control system stop operating due to voltage drop before the voltage drop of the drive system. Then, it is likely that mechanical arrangements are damaged due to unusual rotation of the motor.

To obviate the above occurrences, it is necessary for the control unit to execute adequate control when the operator turns off the power switch at an unexpected timing. For this purpose, Japanese Patent Laid-Open Publication No. 2000-172348, for example, proposes a power supply control scheme using a power supply control switch that does not directly shut off a commercial power supply. When the power supply control switch remains in a shutoff state for a preselected period of time, a power supply shutoff circuit shuts off power supply. More specifically, after the turn-off of a power switch has been detected, necessary control relating to shutoff is executed and then power supply is shut off. This kind of scheme, however, is apt to fail to shutoff power supply in the event of emergency, e.g., when a CPU runs away or when a heater included in a fixing unit malfunctions.

SUMMARY OF THE INVENTION

It is an object of the present invention to provide a simple, stably operable power supply control device capable of obviating unusual occurrences ascribable to the unexpected turn-off of a power supply, and an image forming apparatus including the same.

In accordance with the present invention, a power supply control device includes a power switch including an AC opening/closing circuit assigned to an input AC voltage and at least one signal opening/closing circuit assigned to a signal. A shutoff detector detects the state of the signal opening/closing circuit to thereby detect the turn-off of the power switch.

Also, in accordance with the present invention, a power supply control device for an image forming apparatus includes a power switch including an AC opening/closing circuit assigned to an input AC voltage and at least one signal opening/closing circuit assigned to a signal. A DC power supply converts the AC voltage input via the AC opening/closing circuit to a DC voltage for drive and a DC voltage for control and applies the DC voltages to the image forming apparatus. A shutoff detector detects the state of the signal opening/closing circuit to thereby detect the turn-off of the power switch. A shutoff processing section executes processing, which avoids an error of the image forming apparatus and protects a memory, during an interval between the input of a signal output from the shutoff detector and representative of the shut-off of the power switch and the drop of a DC voltage output to a preselected level.

An image forming apparatus including any one of the above power supply control devices is also disclosed.

BRIEF DESCRIPTION OF THE DRAWINGS

The above and other objects, features and advantages of the present invention will become more apparent from the following detailed description taken with the accompanying drawings in which:

FIG. 6 is a flowchart demonstrating specific shutoff processing unique to the illustrative embodiment.

DESCRIPTION OF THE PREFERRED EMBODIMENT

Figure 1:
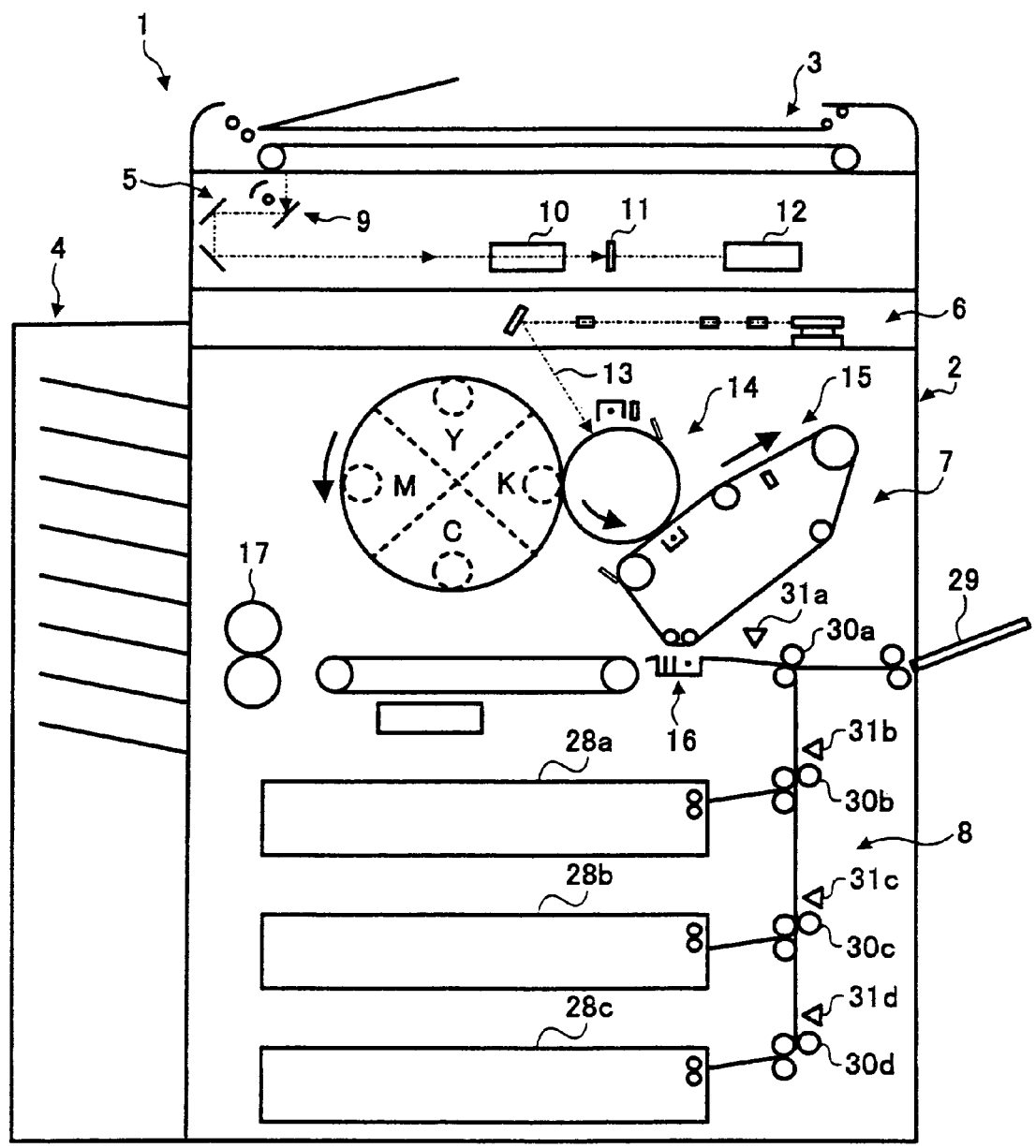
FIG. 1 is a view showing an image forming apparatus embodying the present invention.

Referring to FIG. 1 of the drawings, an image forming apparatus embodying the present invention is shown and implemented as a color copier by way of example. As shown, the color printer, generally 1, is made up of a copier body 2, an ADF (Automatic Document Feeder) 3, and a sorter 4.

The copier body 2 includes a scanning unit 5, a writing unit 6, an engine 7, and a sheet feeding unit 8. The scanning unit 5 includes a carriage 9 loaded with a plurality of mirrors 9, a lens 10, a CCD (Charge Coupled Device) image sensor 11, and a buffer 12. The scanning unit 5 scans a document fed from the ADF 3 to thereby read the image of the document. The writing unit 6 includes a laser or light source and a polygonal mirror and emits a laser beam 13 modulated in accordance with image data representative of the document image toward the engine 7.

Figure 2:
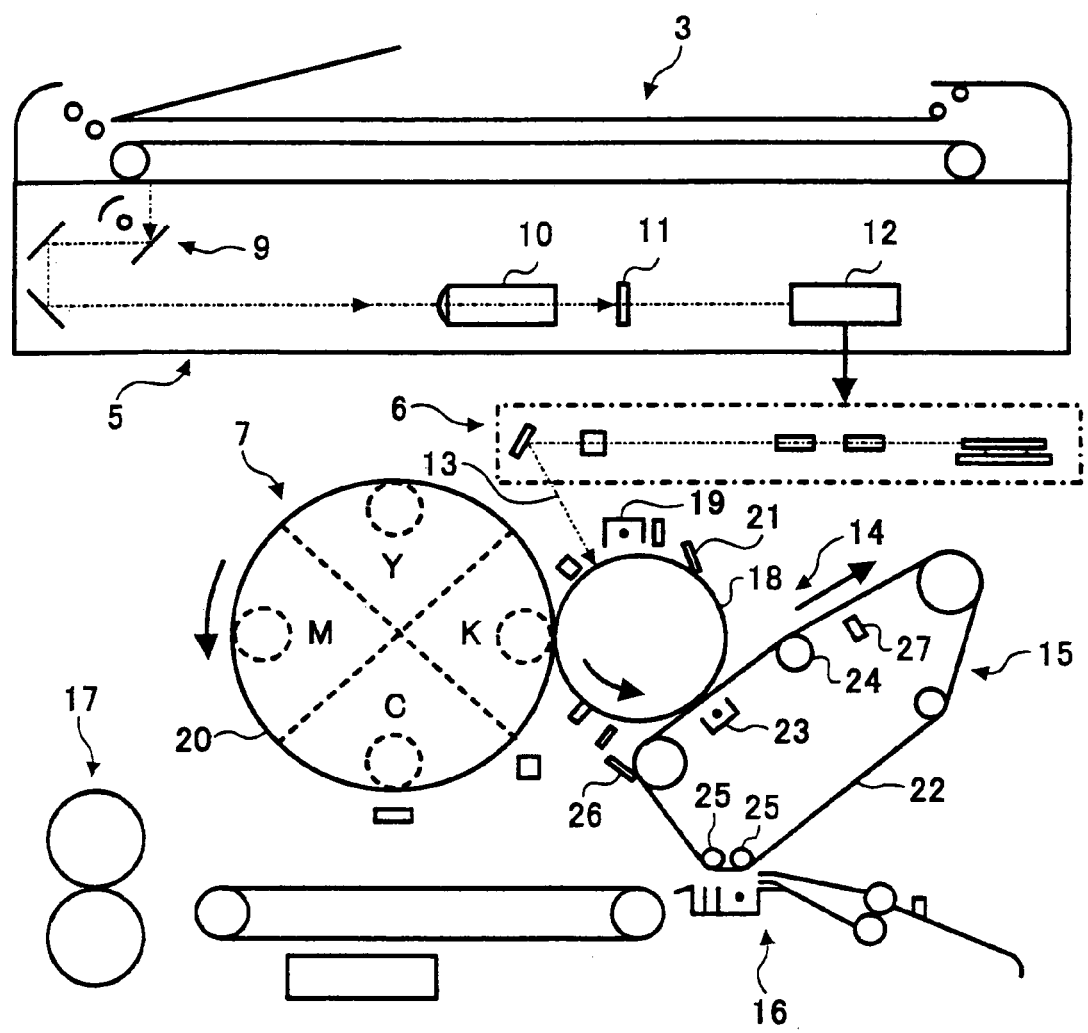
FIG. 2 is a view showing an engine included in the illustrative embodiment in detail.

As shown in FIG. 2, the engine 7 includes an image forming unit 14, a primary image transferring unit 15, a secondary image transferring unit 16, and a fixing unit 17.

The image forming unit 14 includes a station where the laser beam 13 is incident, a revolver type developing unit (revolver hereinafter) 20, and a drum cleaner 21. A charger 19 uniformly charges the surface of a photoconductive drum 18, which is a specific form of an image carrier, to preselected polarity. The laser beam 13 scans the charged surface of the drum 18 to thereby form a latent image. The revolver 20 develops the latent image with corresponding one of cyan (C), magenta (M), yellow (Y) and black (K) toner for thereby producing a toner image.

The primary image transferring unit 15 includes an intermediate image transfer belt (simply belt hereinafter) 22, which is a specific form of an intermediate image transfer body, a primary image transfer station 23, a tension roller 24, a secondary image transfer roller 25, a belt cleaner 26, and a reference position sensor 27. The primary image transferring unit 15 transfers the toner image from the drum 18 to the belt 22 (primary image transfer). The belt 22 is sized larger than the maximum sheet size of A3 applicable to the color copier and can support, when sheets of size A4 or less are used, two toner images thereon. When primary image transfer is not effected, the belt 22 is released from the drum 18 by a mechanism, not shown. The secondary image transferring unit 16 transfers the toner image from the belt 22 to a sheet or recording medium (secondary image transfer). The fixing unit 17 fixes the toner image on the sheet with heat and pressure.

Referring again to FIG. 1, the sheet feeding unit 8 includes a plurality of sheet trays 28a through 28c positioned one above the other, a manual sheet feed tray 29, a registration roller pair 30a, conveyor roller pairs 30b through 30d, and jam sensors 31a through 31d. A sheet is fed from desired one of the sheet trays 28a through 28c to the secondary image transferring unit 16.

The ADF 3 feeds a document to the scanning unit 5 and then collects the document scanned. The sorter 4 includes a plurality of bins positioned one above the other for sorting sheets carrying images thereon and sequentially driven out of the copier body 2.

Figure 3:
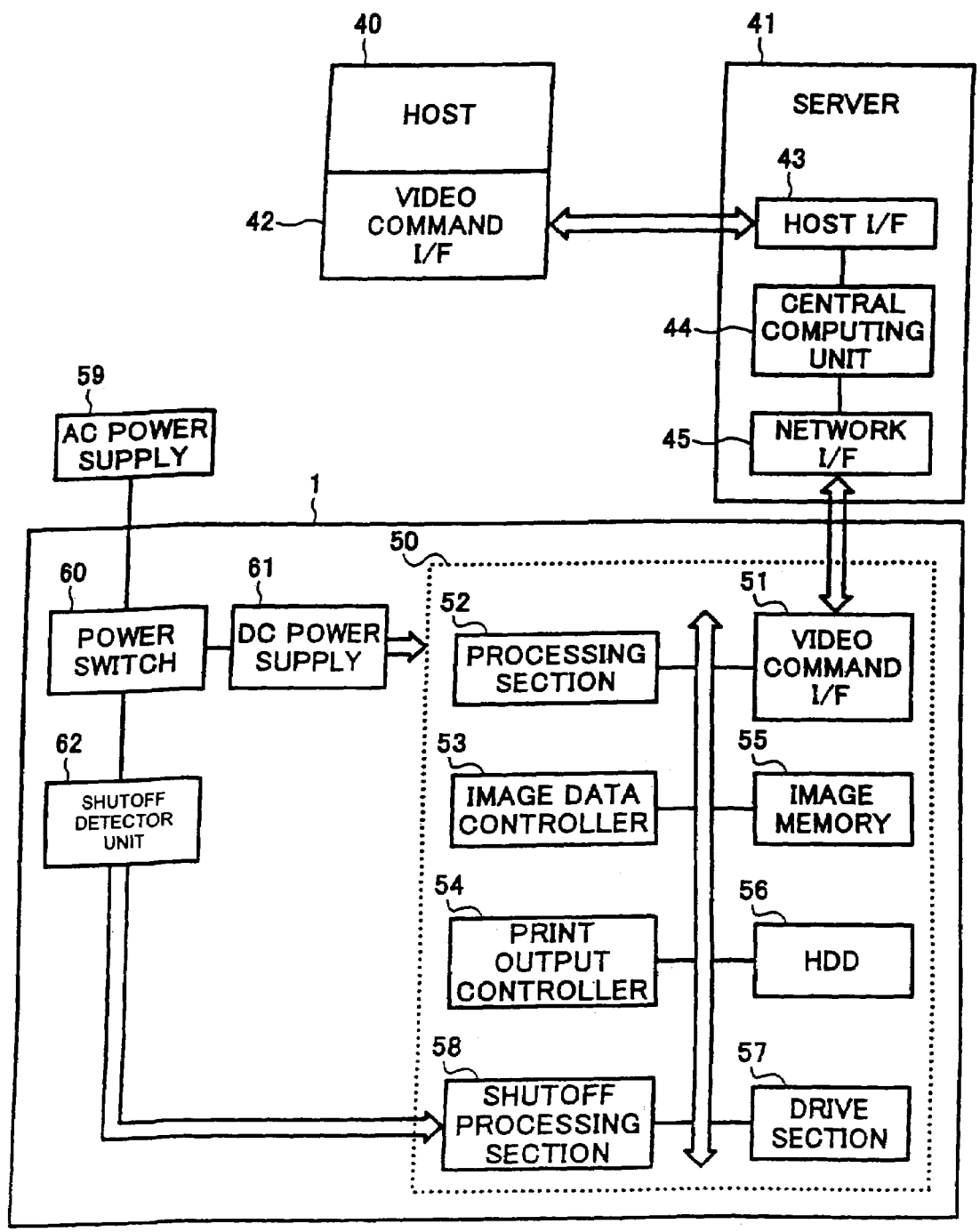
FIG. 3 is a schematic block diagram showing a power supply section and a control section included in the illustrative embodiment.

As shown in FIG. 3, the color copier 1 is connected to a host 40 via a server 41. The host 40 is connected to the server 41 via a video command interface (I/F) 42 included thereon. The server 41 includes a host I/F 43, a central processing unit 44, and a network I/F 45. The host 40 sends print data and additional data including print conditions to the server 41 while the server 41 transfers such data to the color copier 1 via its network I/F 45.

The color copier 1 includes a control unit 50 including a video command interface 51 for connecting the copier 1 to the server 41, a processing section 52, an image data controller 53, a print output controller 54, a large-capacity image memory 55, an HDD (Hard Disk Drive) 56, a drive section 57, and a shutoff processing section 58. The print output controller 54 includes a CPU for controlling the entire color copier 1, a ROM (Read Only Memory) storing a control program, and a RAM (Random Access Memory) for storing control data, although not shown specifically. The image memory 55 is implemented as a nonvolatile memory and used to store image data. The drive section 57 executes, e.g., the conveyance of sheets.

A power supply section for feeding power to the various units of the color copier 1 includes a power switch 60 connected to an AC power supply 59. A DC power supply 61 converts an AC voltage fed from the AC power supply via the power switch 60 to a DC voltage of 24 V for drive and a DC voltage of 5V for control and applies two DC voltages to the control unit 50. A shutoff detector unit 62 is connected between the power switch 60 and the shutoff processing section 58 of the control unit 50.

Figure 4:
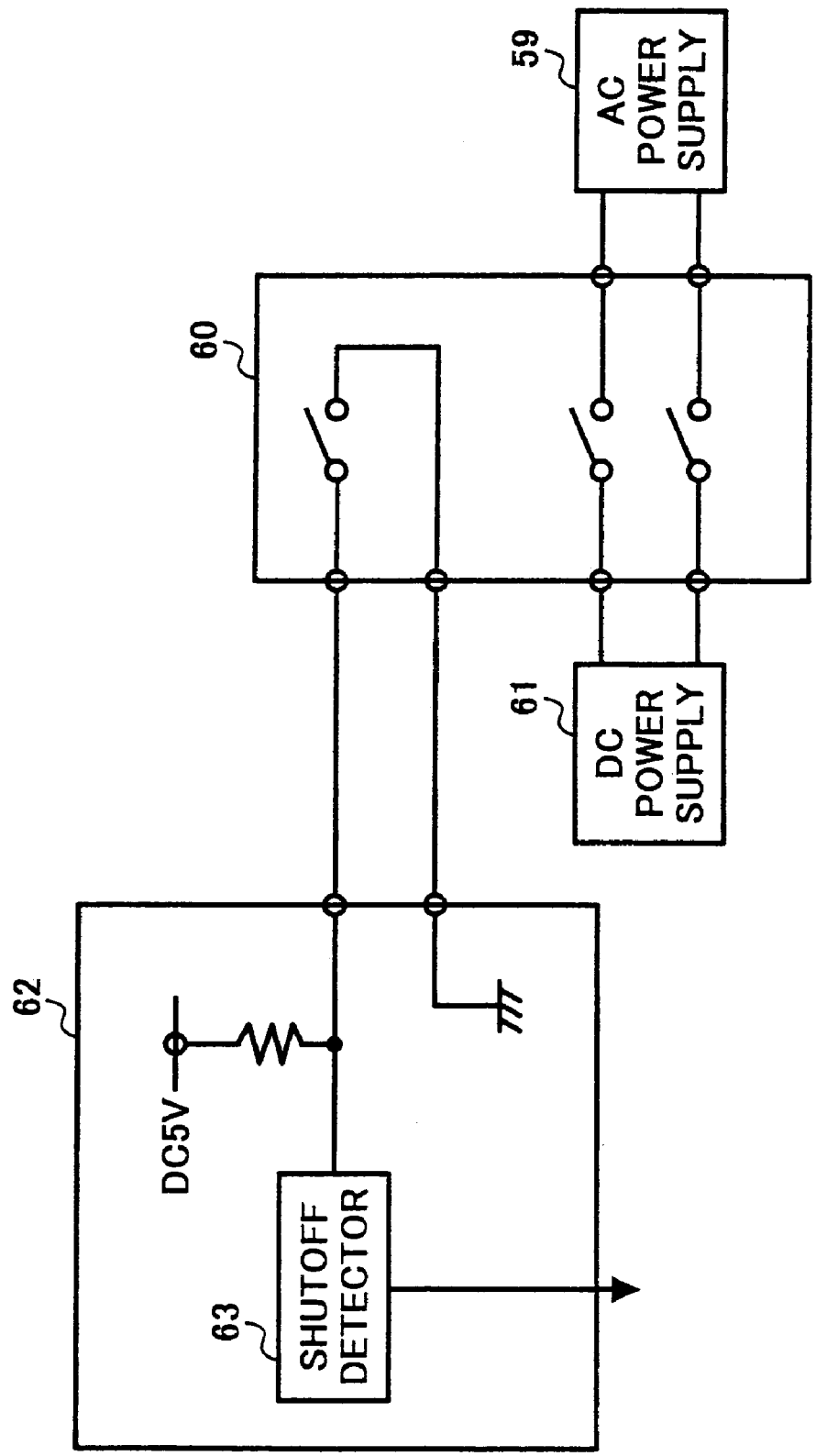
FIG. 4 is a circuit diagram showing a specific configuration of a shutoff detector included in the control section of FIG. 3.

FIG. 4 shows the configuration of the power switch 60. As shown, the shutoff detector unit 62 monitors the ON/OFF state of the power switch 60. More specifically, the input to the shutoff detector 63 goes low when the power switch 60 is in an ON state or gores high when it is in an OFF state.

Figure 5:
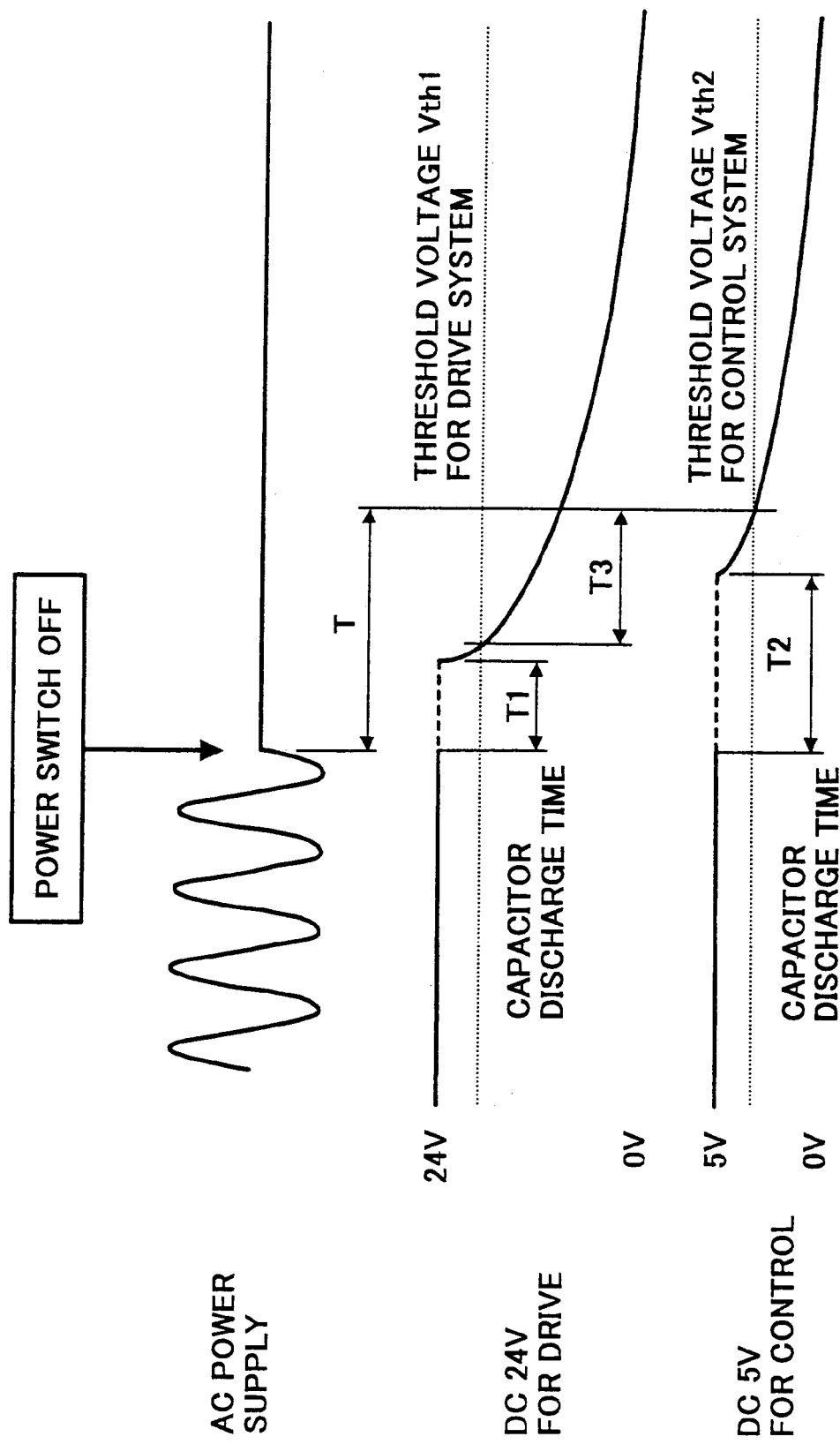
FIG. 5 is a timing chart showing how the output of an AC power supply and the outputs of a DC power supply vary.

Assume that the power switch 60 is turned off when DC 24 V for drive and DC 5 V for control are being output from the DC power supply 61. Then, the DC voltages drop in the manner shown in FIG. 5. As shown, so long as the power switch 60 is in an ON state and feeds the AC voltage to the DC power supply 61, the DC power supply 61 continuously outputs the DC voltages of 24 V and 5V as expected. Although the application of the AC voltage to the DC power supply 61 is shut off as soon as the power switch 60 is turned off, DC 24 V and DC 5 V are continuously output for periods of time of T1 and T2, respectively, because of capacitors included in the DC power supply 61 and controllers. The periods of time T1 and T2 differ from each other due to differences between the capacities of the capacitors and the power consumption.

However, when the capacitors are fully discharged, DC 24 V and DC 5 V start dropping. Further, the time when DC 24 V drops to a threshold voltage Vth1 at which the drive system including motors stops operating and the time when DC 5 V drops to a threshold voltage Vth2 at which the control system including the CPU stops operating differ from each other by a period of time of T3. At this time, if the turn-off of the power switch 60 cannot be detected, then it is likely that an error is detected by accident. To solve this problem, the shutoff processing section 58 executes processing for avoiding accidental error detection and protecting the HDD 56 during the interval between the turn-off of the power switch 60 and the drop of DC 5 V to the threshold voltage Vth2, as will be described hereinafter with reference to FIG. 6.

As shown in FIG. 6, when the operator of the color copier 1 turns off the power switch 60 at an unexpected timing (step S1), the application of the AC voltage to the DC power supply 61 is shut off, so that the shutoff detector 62 detects the shutoff on the basis of the status of the power switch 60 (step S2). The shutoff detector unit 62 sends a signal representative of the turn-off of the power switch 60 to the shutoff processing section 58. In response, the shutoff processing section 58 starts executing shutoff processing (step S3). First, the shutoff processing section 58 ends internal error detection processing meant for an indefinite error and disenables the subsequent error detecting function (step S4).

After the step S4, the shutoff processing section 58 determines whether or not the HDD 56 is being accessed (step S5). If the answer of the step S5 is positive (YES), then the shutoff processing section 58 stops access control relating to the HDD 56 and causes the HDD 56 to release a head, not shown, from a platter, not shown, for thereby protecting data stored in the platter from damage (step S6). The shutoff processing section 58 then determines whether or not the image memory 55 is being accessed (step S7). If the answer of the step S7 is YES, then the shutoff processing section 58 determines whether or not data are being written to the image memory 55 (step S8). If the answer of the step S8 is YES, then the shutoff processing section 58 immediately interrupts the writing operation to protect the data from errors (step S9).

As stated above, when the shutoff detector 62 detects the turn-off of the power switch 60, the shutoff processing section 58 executes shutoff processing. Therefore, even when the power switch 60 is turned off while the color copier 1 is in operation, it is possible to obviate accidental error detection and defective writing or writing of incorrect values in the HDD 56 and image memory 55.

In summary, it will be seen that the present invention provides an image forming apparatus having various unprecedented advantages, as enumerated below.

(1) By detecting the turn-off of a power switch, it is possible to execute stable shutoff control processing.

(2) The shutoff control processing is executed from the time when the turn-off of the power switch is detected to the time when a voltage output drops to a preselected level, thereby obviating accidental error detection and protecting a memory.

(3) Errors in the apparatus all are invalidated over the above period of time, thereby obviating accidental error detection when the power switch is turned off.

(4) The entire system of the apparatus is disenabled after the input of a signal representative of the turn-off of the power switch. This successfully protects an HDD and a memory included in the system from defecting writing or writing of incorrect values.

(5) The apparatus with such a power supply control scheme can form images in a stable manner.

Various modifications will become possible for those skilled in the art after receiving the teachings of the present disclosure without departing from the scope thereof.

What is claimed is:

1. A power supply control device comprising:
    a shutoff detector unit configured to detect a shutoff signal;
    a switch unit operatively connected to each of an AC power supply, a DC power supply, and the shutoff detector unit, the switch unit configured to be manually placed in one of a first state and a second state, the switch unit, while in the first state, being configured to electrically connect the AC power source to the DC power supply, and the switch unit, while in the second state, being configured to electrically disconnect the AC power source from the DC power supply and to send the shutoff signal to the shutoff detector unit; and
    a shutoff processing section operatively connected to the shutoff detector unit and configured to protect a memory in an image forming apparatus based on the detected shutoff signal, wherein the DC power supply is configured to convert an AC voltage from the AC power supply to a DC voltage and to apply said DC voltage to the image forming apparatus, and
    wherein said shutoff processing section is further configured to invalidate all errors detected in the image forming apparatus after the shutoff signal is detected.

2. The device as claimed in claim 1, wherein said shutoff processing section is further configured to disable at least a portion of the image forming apparatus after the shutoff signal is detected.

3. The device as claimed in claim 1, further comprising a hard disk drive, wherein the shutoff processing section is further configured to disable the hard disk drive after the shutoff signal is detected.

4. The device as claimed in claim 1, wherein the shutoff processing section is further configured to protect the memory after the shutoff signal is detected and before the DC voltage is reduced to a predetermined level.

5. The device as claimed in claim 1, wherein the shutoff processing section is further configured to determine if a write operation is being performed on the memory and to interrupt the write operation after the shutoff signal is detected.

6. The device as claimed in claim 1, wherein the switch unit includes
    a first pair of contacts configured to electrically connect the AC power source to the DC power supply while in the first state, and
    a second contact configured to send the shutoff signal to the shutoff detector unit while in the second state.

7. An image forming apparatus including a power supply control device, said power supply control device comprising:
    a shutoff detector unit configured to detect a shutoff signal; a switch unit operatively connected to each of an AC power supply, a DC power supply, and the shutoff detector unit, the switch unit configured to be manually placed in one of a first state and a second state, the switch unit, while in the first state, being configured to electrically connect the AC power source to the DC power supply, the switch unit, while in the second state, being configured to electrically disconnect the AC power source from the DC power supply and to send the shutoff signal to the shutoff detector unit; and
    a shutoff processing section operatively connected to the shutoff detector unit and configured to protect a memory in an image forming apparatus based on the detected shutoff signal,
    wherein said shutoff processing section is further configured to invalidate all errors detected in the image forming apparatus after the shutoff signal is detected.

8. The image forming apparatus as claimed in claim 7, wherein said shutoff processing section is further configured to disable at least a portion of the image forming apparatus after the shutoff signal is detected.

9. The image forming apparatus as claimed in claim 7, further comprising a hard disk drive, wherein the shutoff processing section is further configured to disable the hard disk drive after the shutoff signal is detected.

10. The image forming apparatus as claimed in claim 7, wherein the shutoff processing section is further configured to protect the memory after the shutoff signal is detected and before the DC voltage is reduced to a predetermined level.

11. The image forming apparatus as claimed in claim 7, wherein the shutoff processing section is further configured to determine if a write operation is being performed on the memory and to interrupt the write operation after the shutoff signal is detected.

12. The image forming apparatus as claimed in claim 7, wherein the switch unit includes
    a first pair of contacts configured to electrically connect the AC power source to the DC power supply while in the first state, and
    a second contact configured to send the shutoff signal to the shutoff detector unit while in the second state.

* * * * *